US009883124B2

(12) United States Patent
Sugiyama et al.

(10) Patent No.: US 9,883,124 B2
(45) Date of Patent: Jan. 30, 2018

(54) SOLID-STATE IMAGING DEVICE (71) Applicant: HAMAMATSU PHOTONICS K.K., Hamamatsu-shi, Shizuoka (JP)

(72) Inventors: Yukinobu Sugiyama, Hamamatsu (JP); Kenta Endo, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 15/309,253

(22) PCT Filed: Apr. 7, 2015

(86) PCT No.: PCT/JP2015/060885
§ 371 (c)(1),
(2) Date: Nov. 7, 2016

(87) PCT Pub. No.: WO2015/174169
PCT Pub. Date: Nov. 19, 2015

(65) Prior Publication Data
US 2017/0078595 A1  Mar. 16, 2017

(30) Foreign Application Priority Data
May 13, 2014  (JP) ................................. 2014-099705

(51) Int. Cl.
*H04N 5/355* (2011.01)
*H04N 5/341* (2011.01)
(Continued)

(52) U.S. Cl.
CPC ............. *H04N 5/355* (2013.01); *H04N 5/341* (2013.01); *H04N 5/347* (2013.01); *H04N 5/353* (2013.01);
(Continued)

(58) Field of Classification Search
CPC ........ H04N 5/341; H04N 5/347; H04N 5/353; H04N 5/374; H04N 5/3745; H04N 5/376; H04N 5/378
See application file for complete search history.

(56) References Cited

U.S. PATENT DOCUMENTS

2008/0049133 A1   2/2008  Bock
2011/0316839 A1*  12/2011 Minowa ............ H01L 27/14609
                                                     345/211
(Continued)

FOREIGN PATENT DOCUMENTS

EP    2 683 157         1/2014
JP    2000-152095 A     5/2000
(Continued)

OTHER PUBLICATIONS

International Preliminary Report on Patentability dated Nov. 24, 2016 for PCT/JP2015/060885.

*Primary Examiner* — Amy Hsu (57) ABSTRACT

A solid-state imaging device includes a photodetecting unit, a row control unit, a column control unit, and a signal readout unit. The photodetecting unit includes M×N pixel units P(1,1) to P(M,N) two-dimensionally arrayed in M rows and N columns. Each pixel unit P(m,n) includes a photodiode PD, an amplifying transistor Tr1, a transfer transistor Tr2, a readout transistor Tr3, a first initialization transistor Tr4, and a second initialization transistor Tr5. One of the transfer transistor Tr2 and the first initialization transistor Tr4 performs an on/off operation based on a control signal output from the row control unit, and the other performs an on/off operation based on a control signal output from the column control unit.

3 Claims, 12 Drawing Sheets (51) Int. Cl.
    *H04N 5/353*     (2011.01)
    *H04N 5/374*     (2011.01)
    *H04N 5/376*     (2011.01)
    *H04N 5/347*     (2011.01)
    *H04N 5/3745*     (2011.01)
    *H04N 5/378*     (2011.01)

(52) U.S. Cl.
    CPC ............. *H04N 5/374* (2013.01); *H04N 5/376* (2013.01); *H04N 5/378* (2013.01); *H04N 5/3745* (2013.01)

(56) References Cited

U.S. PATENT DOCUMENTS

| | | | |
|---|---|---|---|
| 2012/0182455 A1* | 7/2012 | Gomi | H04N 5/23245 348/311 |
| 2013/0120180 A1* | 5/2013 | Kawahito | H04N 5/357 341/172 |
| 2013/0208101 A1* | 8/2013 | Ono | A61B 1/00193 348/65 |
| 2014/0146211 A1* | 5/2014 | Mori | H04N 5/3575 348/308 |
| 2015/0103219 A1* | 4/2015 | Kasuga | H04N 5/363 348/300 |

FOREIGN PATENT DOCUMENTS

| | | |
|---|---|---|
| JP | 2012-070056 A | 4/2012 |
| JP | 5247397 B2 | 7/2013 |
| WO | WO 2008/100432 | 8/2008 |
| WO | WO-2013/024788 A1 | 2/2013 |

\* cited by examiner

SOLID-STATE IMAGING DEVICE

TECHNICAL FIELD

The present invention relates to a solid-state imaging device.

BACKGROUND ART

A solid-state imaging device includes a photodetecting unit including a plurality of pixel units arrayed two-dimensionally, a control unit that controls an operation of each pixel unit of the photodetecting unit, and a signal readout unit that reads out a signal from each of the pixel units of the photodetecting unit. Each of the pixel units may include a photodiode that generates a charge of an amount according to an incident light amount, an amplifying transistor that outputs a signal having a value according to an amount of charge of a gate terminal, and a transfer transistor that transfers the charge generated in the photodiode to the gate terminal of the amplifying transistor.

In a solid-state imaging device of an invention disclosed in Patent Document 1, each pixel unit includes two transfer transistors connected in parallel. One of the transfer transistors performs an on/off operation by a control signal applied in common to a plurality of pixel units in the same row. The other transfer transistor performs an on/off operation by a control signal applied in common to the plurality of pixel units in the same column. With this configuration, in the solid-state imaging device, a charge accumulation period in each of the pixel units can be set to various times, sensitivity of each of the pixel units can be variously set, and a wide dynamic range can be achieved.

CITATION LIST

Patent Literature

Patent Document 1: Japanese Patent Publication No. 5247397

SUMMARY OF INVENTION

Technical Problem

However, in the solid-state imaging device of the invention disclosed in Patent Document 1, a degree of freedom in an accumulation period setting is not sufficient.

The present invention has been made to solve the above problem, and an object thereof is to provide a solid-state imaging device capable of setting accumulation periods of various patterns different for each pixel.

Solution to Problem

A solid-state imaging device according to the present invention includes a photodetecting unit including M×N pixel units P(1,1) to P(M,N) two-dimensionally arrayed in M rows and N columns; a row control unit outputting a control signal for controlling an operation of N pixel units P(m,1) to P(m,N) in an m-th row of the photodetecting unit to each row; a column control unit outputting a control signal for controlling an operation of M pixel units P(1,n) to P(M,n) in an n-th column of the photodetecting unit to each column; and a signal readout unit reading out signals from the M×N pixel units P(1,1) to P(M,N) of the photodetecting unit. Here, M and N are each an integer of 2 or more, m is an integer of 1 or more and M or less, and n is an integer of 1 or more and N or less.

Further, in the above solid-state imaging device, each pixel unit P(m,n) of the photodetecting unit includes a photodiode that generates a charge of an amount according to an incident light amount, an amplifying transistor that outputs a signal having a value according to an amount of charge of a gate terminal, a transfer transistor that transfers the charge generated in the photodiode to the gate terminal of the amplifying transistor, a readout transistor that outputs the signal output from the amplifying transistor to the signal readout unit, a first initialization transistor that initializes charge accumulation of the photodiode, and a second initialization transistor that initializes charge accumulation of the gate terminal of the amplifying transistor.

Further, in the above solid-state imaging device, one of the transfer transistor and the first initialization transistor performs an on/off operation based on the control signal output from the row control unit and the other performs an on/off operation based on the control signal output from the column control unit.

Advantageous Effects of Invention

According to the present invention, accumulating periods of various patterns including a plurality of discrete accumulation periods can be set for each pixel, and thus it is possible to further widen a dynamic range.

DESCRIPTION OF EMBODIMENTS

Hereinafter, an embodiment of the present invention will be described in detail with reference to the accompanying drawings. In the description of the drawings, the same elements will be denoted by the same reference signs, without redundant description.

Figure 1:
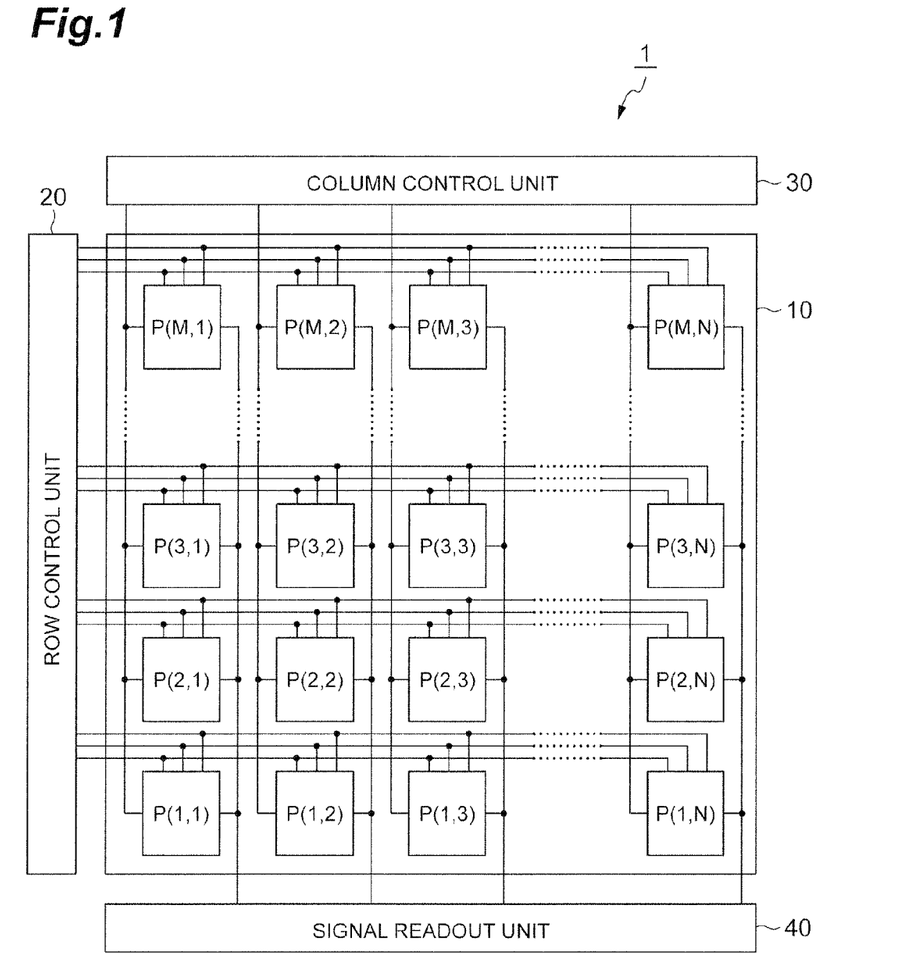
FIG. 1 is a diagram illustrating an entire configuration of a solid-state imaging device 1 of an embodiment.

FIG. 1 is a diagram illustrating an entire configuration of a solid-state imaging device 1 of an embodiment. The solid-state imaging device 1 includes a photodetecting unit 10, a row control unit 20, a column control unit 30, and a signal readout unit 40. The photodetecting unit 10 includes M×N pixel units P(1,1) to P(M,N) that are two-dimensionally arrayed in M rows and N columns. The M×N pixel units P(1,1) to P(M,N) have a common configuration. Each pixel unit P(m,n) is located in an m-th row and an n-th column.

The row control unit 20 outputs a control signal for controlling an operation of N pixel units P(m,1) to P(m,N) in the m-th row of the photodetecting unit 10 to each row. The column control unit 30 outputs a control signal for controlling an operation of M pixel units P(1,n) to P(M,n) in the n-th column of the photodetecting unit 10 to each column. The signal readout unit 40 reads out signals from the M×N pixel units P(1,1) to P(M,N) of the photodetecting unit 10. Here, M and N are each an integer of 2 or more, m is any integer of 1 or more and M or less, and n is any integer of 1 or more and N or less.

Figure 2:
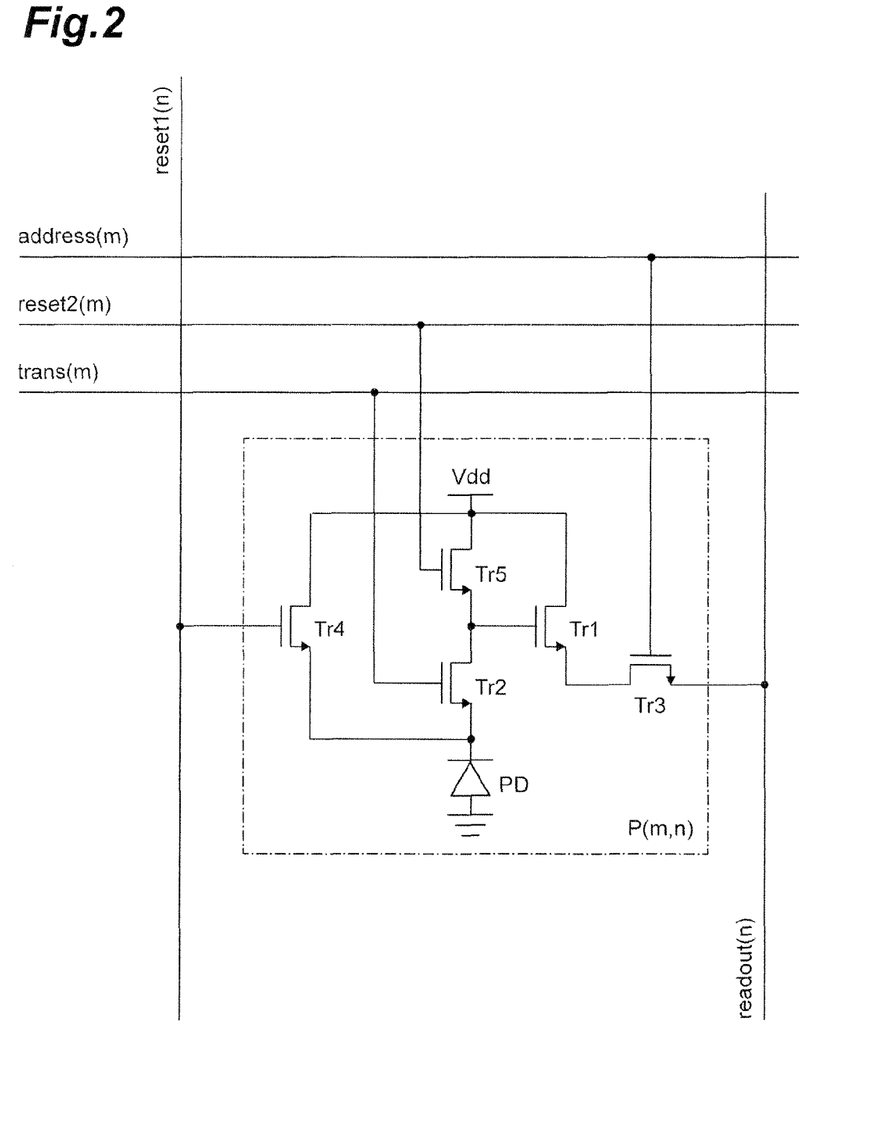
FIG. 2 is a diagram illustrating a configuration of each pixel unit P(m,n) of the solid-state imaging device 1 of the embodiment.

FIG. 2 is a diagram illustrating a configuration of each pixel unit P(m,n) of the solid-state imaging device 1 of the embodiment. The pixel unit P(m,n) includes a photodiode PD, an amplifying transistor Tr1, a transfer transistor Tr2, a readout transistor Tr3, a first initialization transistor Tr4, and a second initialization transistor Tr5. The transistors Tr1 to Tr5 are NMOS transistors.

An anode terminal of the photodiode PD is grounded. A cathode terminal of the photodiode PD is connected to a source terminal of the transfer transistor Tr2 and also connected to a source terminal of the first initialization transistor Tr4, and a gate terminal of the amplifying transistor Tr1 is connected to a drain terminal of the transfer transistor Tr2 and also connected to a source terminal of the second initialization transistor Tr5. A source terminal of the amplifying transistor Tr1 is connected to a drain terminal of the readout transistor Tr3. A power supply potential VDD is applied to respective drain terminals of the amplifying transistor Tr1, the first initialization transistor Tr4, and the second initialization transistor Tr5.

A trans(m) signal output from the row control unit 20 to each row is input to a gate terminal of the transfer transistor Tr2. The transfer transistor Tr2 of each of the N pixel units P(m,1) to P(m,N) in the m-th row performs an on/off operation according to a level of the trans(m) signal. An address(m) signal output from the row control unit 20 to each row is input to a gate terminal of the readout transistor Tr3. The readout transistor Tr3 of each of the N pixel units P(m,1) to P(m,N) in the m-th row performs an on/off operation according to a level of the address(m) signal.

A reset2(m) signal output from the row control unit 20 to each row is input to a gate terminal of the second initialization transistor Tr5. The second initialization transistor Tr5 of each of the N pixel units P(m,1) to P(m,N) in the m-th row performs an on/off operation according to a level of the reset2(m) signal. A reset1(n) signal output from the column control unit 30 to each column is input to a gate terminal of the first initialization transistor Tr4. The first initialization transistor Tr4 of each of the M pixel units P(1,n) to P(M,n) in the n-th column performs an on/off operation according to a level of the reset1(n) signal.

The row control unit 20 outputs the trans(m) signal, the address(m) signal, and the reset2(m) signal as control signals for controlling the operation of the N pixel units P(m,1) to P(m,N) in the m-th row of the photodetecting unit 10. The column control unit 30 outputs the reset1(n) signal as a control signal for controlling the operation of the M pixel units P(1,n) to P(M,n) in the n-th column of the photodetecting unit 10.

The photodiode PD can generate a charge of an amount according to an incident light amount, and accumulate the charge in a junction capacitance portion. In the gate terminal of the amplifying transistor Tr1, a floating diffusion is formed, or a capacitance portion is separately formed, and accordingly, the charge can be accumulated. The transfer transistor Tr2 transfers the charge generated in the photodiode PD to the gate terminal of the amplifying transistor Tr1 during a period of an ON state. The amplifying transistor Tr1 outputs a signal having a value according to the amount of charge of the gate terminal from a source terminal. The readout transistor Tr3 outputs the signal output from the amplifying transistor Tr1 as a readout(n) signal to the signal readout unit 40 during a period of an ON state. The first initialization transistor Tr4 initializes charge accumulation of the photodiode PD during a period of an ON state. The second initialization transistor Tr5 initializes charge accumulation of the gate terminal of the amplifying transistor Tr1 during a period of an ON state.

An overview of the operation of each pixel unit P(m,n) is as follows. The reset2(m) signal output from the row control unit 20 to each row is at a high level over a certain period of time, and accordingly, in each of the N pixel units P(m,1) to P(m,N) in the m-th row, the second initialization transistor Tr5 is turned on and the charge accumulation in the gate terminal of the amplifying transistor Tr1 is initialized. The reset1(n) signal output from the column control unit 30 to each column is at a high level over a certain period of time, and accordingly, in each of the M pixel units P(1,n) to P(M,n) in the n-th column, the first initialization transistor Tr4 is turned on and the charge accumulation in the photodiode PD is initialized.

When the reset1(n) signal is changed from the high level to a low level, the first initialization transistor Tr4 in each of the M pixel units P(1,n) to P(M,n) in the n-th column is turned off and the charge accumulation in the photodiode PD starts. Thereafter, when the trans(m) signal output from the row control unit 20 to each row is at a high level over a certain period of time and is changed to a low level, the charge generated in the photodiode PD by the time is transferred to the gate terminal of the amplifying transistor Tr1 in each of the N pixel units P(m,1) to P(m,N) in the m-th row. Then, the address(m) signal output from the row control unit 20 to each row is at a high level over a certain period of time, and accordingly, in each of the N pixel units P(m,1) to P(m,N) in the m-th row, the readout transistor Tr3 is turned on and a signal output from the amplifying transistor Tr1 is output to the signal readout unit 40 as the readout(n) signal.

A charge accumulation period in each pixel unit P(m,n) is a period from a time at which the reset1(n) signal applied to the gate terminal of the first initialization transistor Tr4 is changed from the high level to the low level (a charge accumulation start time) to a time at which the trans(m) signal applied to the gate terminal of the transfer transistor Tr2 is changed from the high level to the low level (a charge accumulation end time). A value of the readout(n) signal output from each pixel unit P(m,n) is a value according to the light amount incident on the photodiode PD over the charge accumulation period.

In the embodiment described above, in each pixel unit P(m,n), the transfer transistor Tr2 performs the on/off operation based on the trans(m) signal output from the row control unit 20, and the first initialization transistor Tr4 performs the on/off operation based on the reset1(n) signal output from the column control unit 30. Conversely, in each pixel unit P(m,n), the first initialization transistor Tr4 may perform the on/off operation based on the control signal output from the row control unit 20, and the transfer transistor Tr2 may perform the on/off operation based on the control signal output from the column control unit 30.

Thus, in each pixel unit P(m,n), one of the transfer transistor Tr2 and the first initialization transistor Tr4 performs the on/off operation based on the control signal output from the row control unit 20, and the other performs the on/off operation based on the control signal output from the column control unit 30, and thus, it is possible to further widen a dynamic range. This will be described through a comparison between the embodiment and a comparative example.

Figure 3:
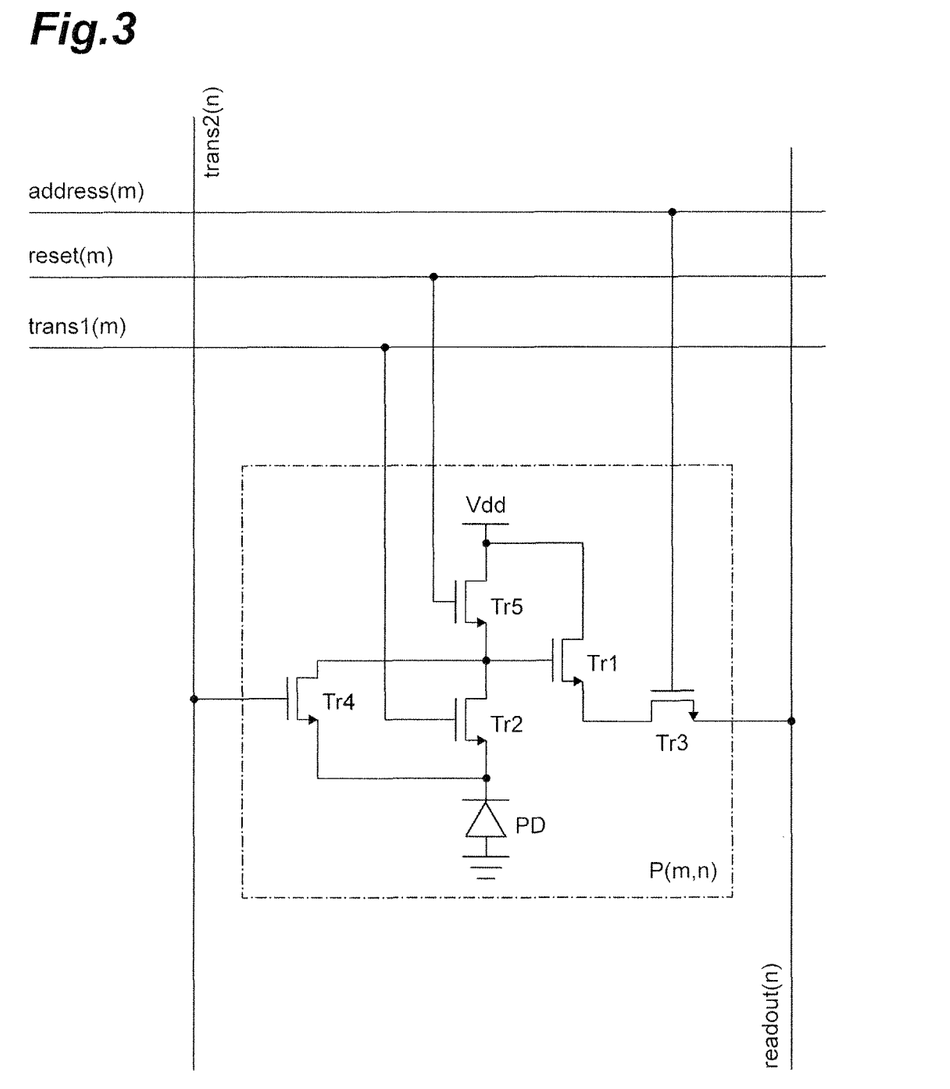
FIG. 3 is a diagram illustrating a configuration of each pixel unit P(m,n) of a solid-state imaging device of a comparative example.

FIG. 3 is a diagram illustrating a configuration of each pixel unit P(m,n) of a solid-state imaging device of a comparative example. When this pixel unit is compared with the pixel unit P(m,n) of the embodiment illustrated in FIG. 2, the pixel unit P(m,n) of the comparative example illustrated in FIG. 3 is the same as the pixel unit of the embodiment in that the photodiode PD and the five transistors Tr1 to Tr5 are included, connection relationships between the elements are substantially the same, and the address(m) signal output from a row control unit to each row is input to the gate terminal of the readout transistor Tr1.

When the pixel unit is compared with the pixel unit P(m,n) of the embodiment illustrated in FIG. 2, the pixel unit P(m,n) of the comparative example illustrated in FIG. 3 is different from the pixel unit of the embodiment in that the transistor Tr4 is used as a transfer transistor, and a drain terminal of the transfer transistor Tr4 is connected to the gate terminal of the amplifying transistor Tr1. Further, the pixel unit is different from the pixel unit of the embodiment in that trans1(m) output from the row control unit to each row is input to the gate terminal of the transfer transistor Tr2, trans2(n) output from a column control unit to each column is input to the gate terminal of the transfer transistor Tr4, and reset(m) output from the row control unit to each row is input to the gate terminal, of the initialization transistor Tr5.

Figure 4:
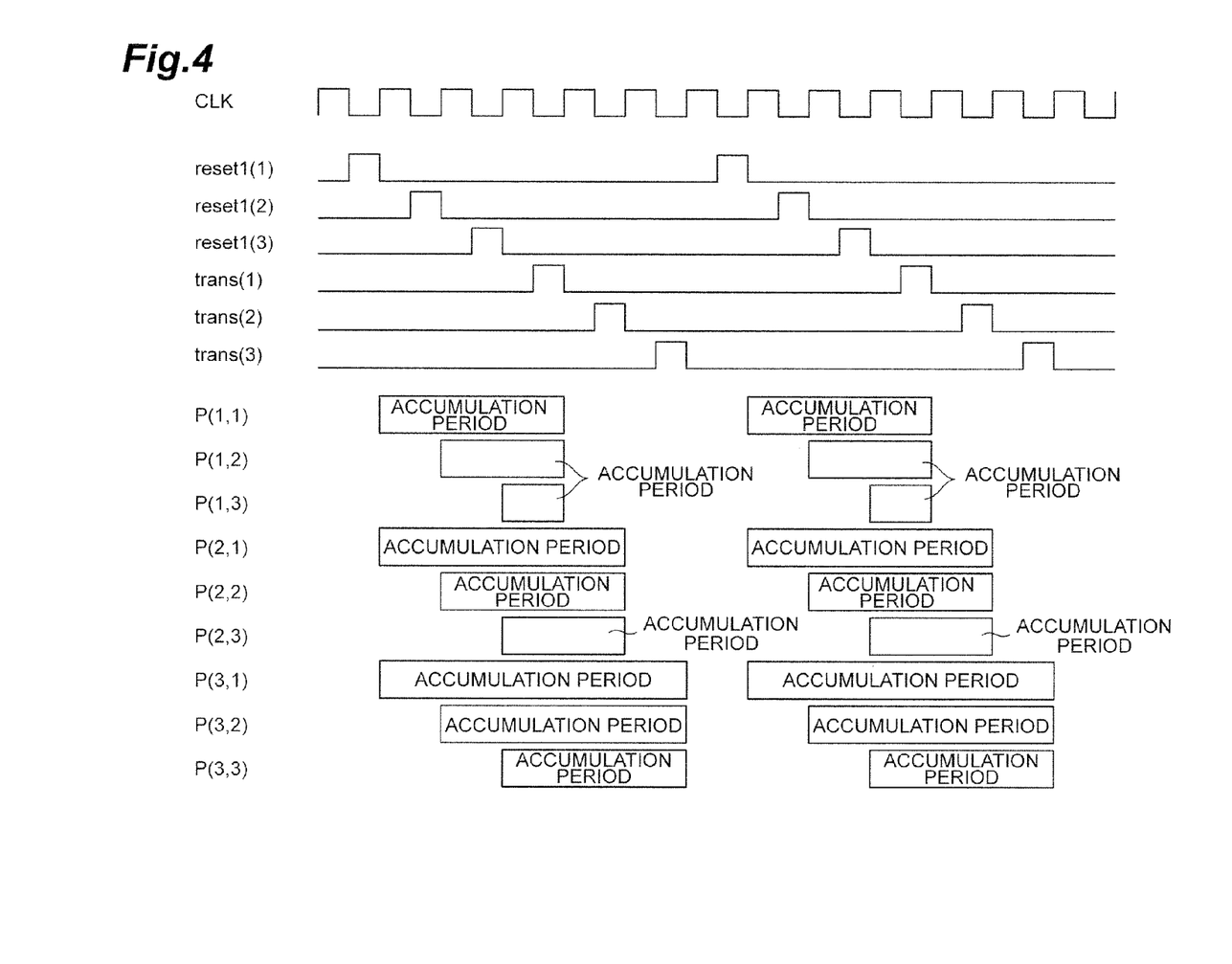
FIG. 4 is a timing chart illustrating an operation example of the solid-state imaging device 1 of the embodiment.
Figure 5:
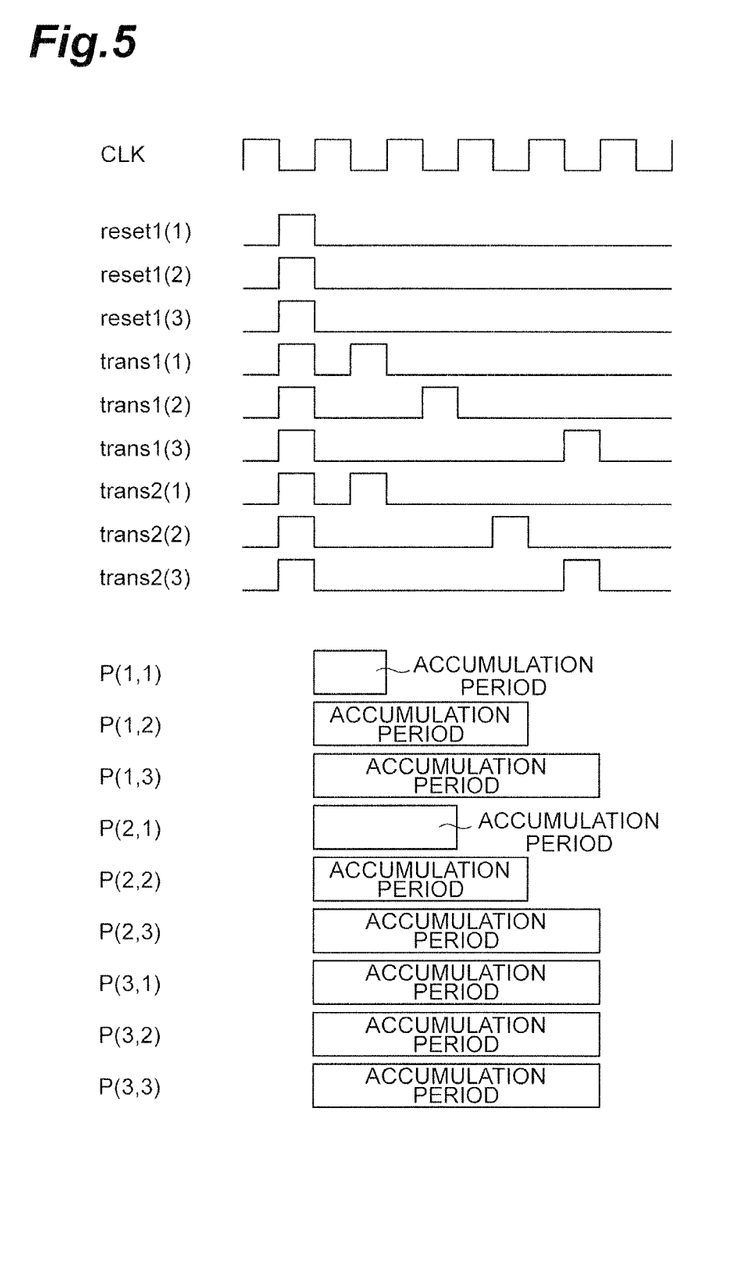
FIG. 5 is a timing chart illustrating an operation example of the solid-state imaging device of the comparative example.

FIG. 4 is a timing chart illustrating an operation example of the solid-state imaging device 1 of the embodiment. FIG. 5 is a timing chart illustrating an operation example of the solid-state imaging device of the comparative example. Both of these figures illustrate a charge accumulation period for each of the pixel units P(1,1) to P(3,3) of three rows and three columns. In the comparative example (FIG. 5), the accumulation period is only one continuous period. An accumulation start time cannot be changed within the same row. If the accumulation period is short, an accumulation end time is necessarily early. Further, a plurality of accumulation periods cannot be set with a non-accumulation period interposed therebetween.

On the other hand, in the embodiment (FIG. 4), a length of a charge accumulation period of the pixel unit P(1,1) corresponds to three cycles of a clock CLK. A length of the charge accumulation period of the pixel unit P(1,2) corresponds to two cycles of the clock CLK. A length of the charge accumulation period of the pixel unit P(1,3) corresponds to one cycle of the clock CLK. A length of the charge accumulation period of the pixel unit P(2,1) corresponds to four cycles of the clock CLK. A length of the charge accumulation period of the pixel unit P(2,2) corresponds to three cycles of the clock CLK. A length of the charge accumulation period of the pixel unit P(2,3) corresponds to two cycles of the clock CLK. A length of the charge accumulation period of the pixel unit P(3,1) corresponds to five cycles of the clock CLK. A length of the charge accumulation period of the pixel unit P(3,2) corresponds to four cycles of the clock CLK. A length of the charge accumulation period of the pixel unit P(3,3) corresponds to three cycles of the clock CLK.

Thus, in the embodiment, a setting of both of the charge accumulation start time and the charge accumulation end time can be changed for each row or column, and further, a plurality of discrete accumulation periods can also be set. From this function, the length of the charge accumulation period for each pixel unit can be variously set, sensitivity of each pixel unit can be variously set, and a wide dynamic range can be achieved.

Figure 12:
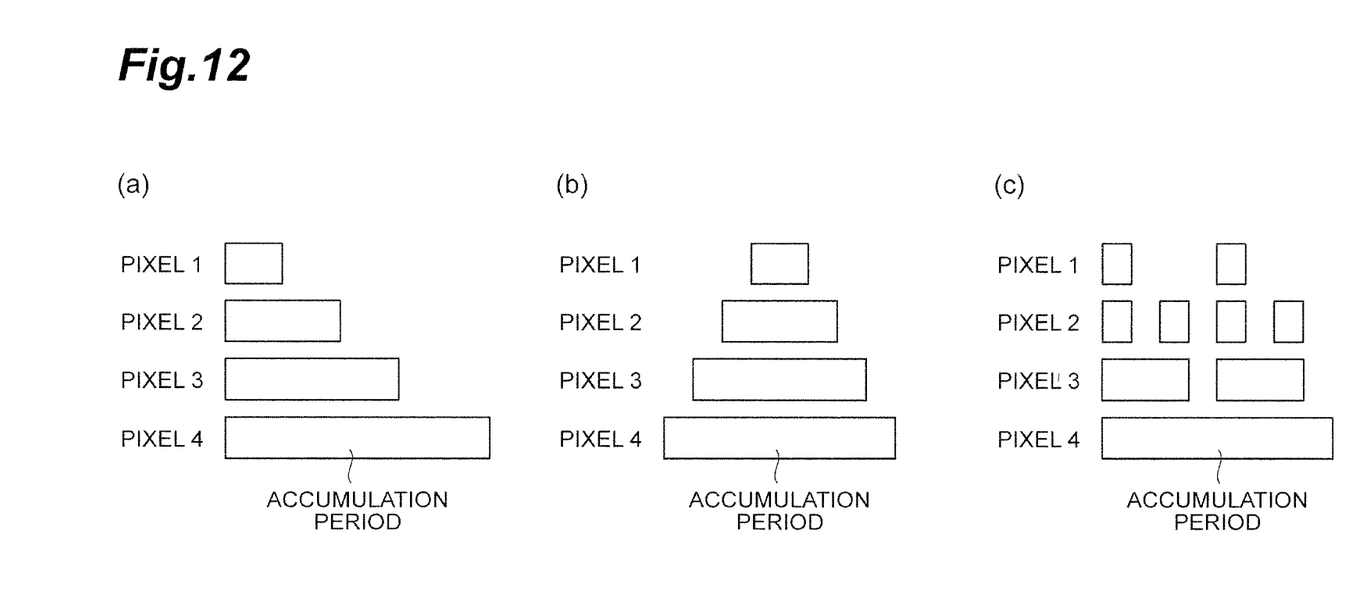
FIG. 12 includes (a)-(c) diagrams illustrating various patterns of charge accumulation periods.

In the comparative example, the accumulation start time cannot be changed in the same row ((a) in FIG. 12). Further, in the comparative example, a plurality of accumulation periods cannot be set with a non-accumulation period interposed therebetween. On the other hand, in the embodiment, since centroids of the accumulation periods can be aligned ((b) in FIG. 12) or a plurality of accumulation periods can be set with a non-accumulation period interposed therebetween ((c) in FIG. 12), the embodiment is suitable when an image including an object of which luminance is changed at a high speed is captured with a high dynamic range.

In order to set a plurality of accumulation periods with a non-accumulation period interposed therebetween, it is necessary to transfer the charge of the photodiode PD to the gate terminal of the amplifying transistor Tr1 a plurality of times. For this purpose, it is necessary for the photodiode PD to be configured as an embedded type and to be fully depleted with zero capacitance so that the charge is not capacitively distributed. Thus, it is possible to transfer all of the charge accumulated in the photodiode PD to the gate terminal of the amplifying transistor Tr1.

Figure 6:
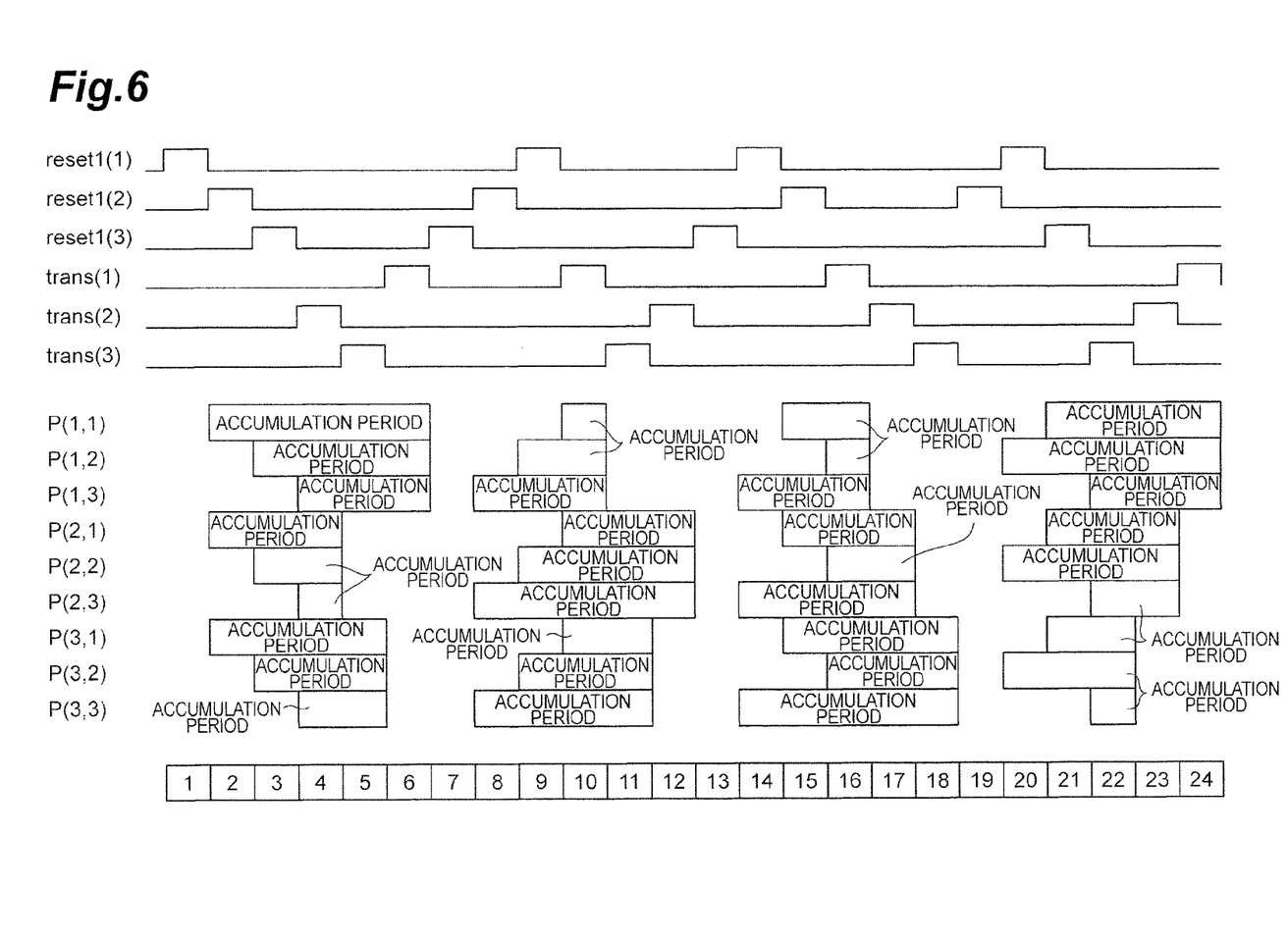
FIG. 6 is a timing chart illustrating an operation example of the solid-state imaging device 1 of the embodiment.

FIG. 6 is a timing chart illustrating another operation example of the solid-state imaging device 1 of the embodiment. FIG. 6 illustrates a case in which there are four charge accumulation periods for each of the pixel units P(1,1) to P(3,3) of three rows and three columns within one frame period (a period from output of the readout(n) signal from each pixel unit to a subsequent output of the readout(n) signal). As shown in this operation example, a length of each charge accumulation period of each pixel unit can be variously set in the embodiment. A sum of lengths of the first and second charge accumulation periods of each pixel unit can be set to be constant, and a sum of lengths of the third and fourth charge accumulation periods of each pixel unit can be set to be constant.

Figure 7:
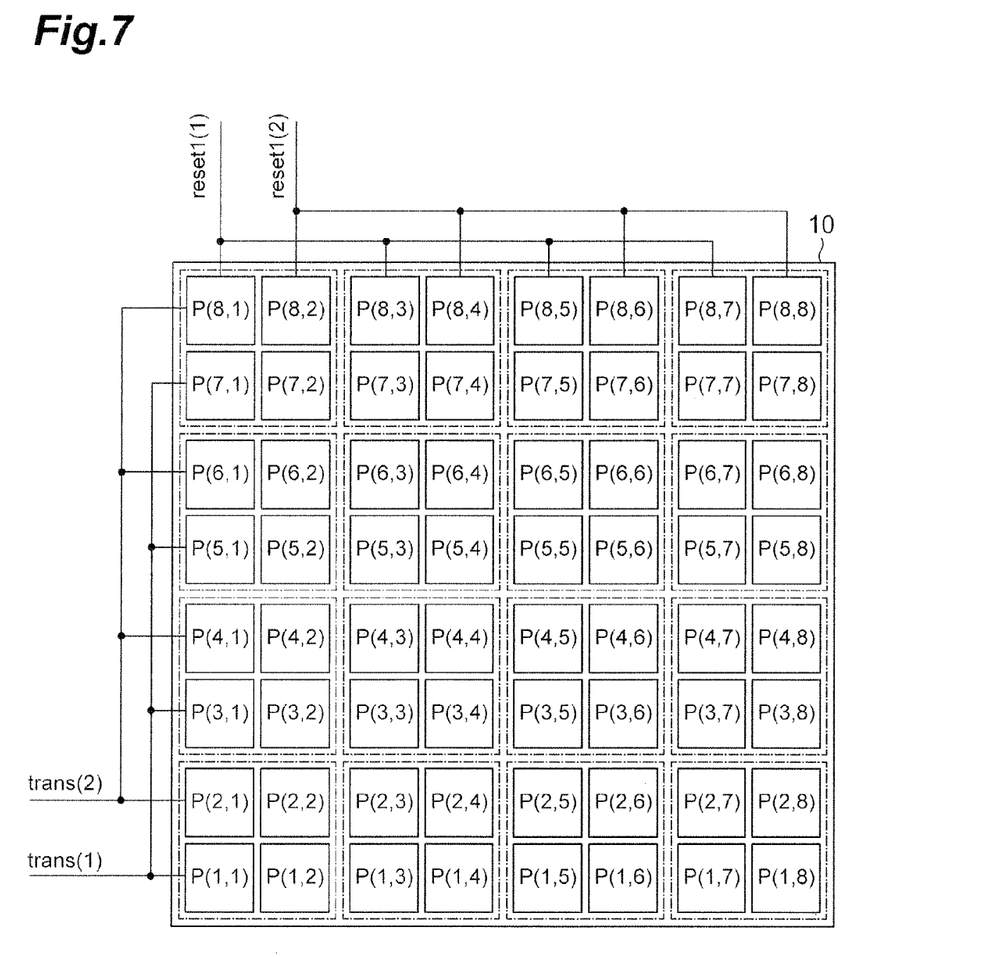
FIG. 7 is a diagram illustrating a main configuration of a solid-state imaging device of another embodiment.

FIG. 7 is a diagram illustrating a main configuration of a solid-state imaging device of another embodiment. In this embodiment, M×N pixel units P(1,1) to P(M,N) of the photodetecting unit 10 are divided into a plurality of blocks, and each of the plurality of blocks includes pixel units arrayed in Q rows and R columns. In a pixel unit of a q-th row and an r-th column in each of the plurality of blocks, the transfer transistor Tr2 performs an on/off operation based on the same control signal and the first initialization transistor Tr4 performs an on/off operation based on the same control signal. At least one of Q and R is an integer of 2 or more.

In FIG. 7, M=N=8 and Q=R=2. That is, 8×8 pixel units P(1,1) to P(8,8) are divided into 4×4 blocks, and each block includes pixel units arrayed in two rows and two columns. In the pixel unit P(q,r) of the q-th row and the r-th column in each block, the transfer transistor Tr2 performs the on/off operation based on a trans(q) signal and the first initialization transistor Tr4 performs the on/off operation based on a reset1(r) signal. That is, in each of the 4×4 blocks, a charge accumulation period of the pixel unit at the same position is the same. q is any integer of 1 or more and Q or less, and r is any integer of 1 or more and R or less.

Figure 8:
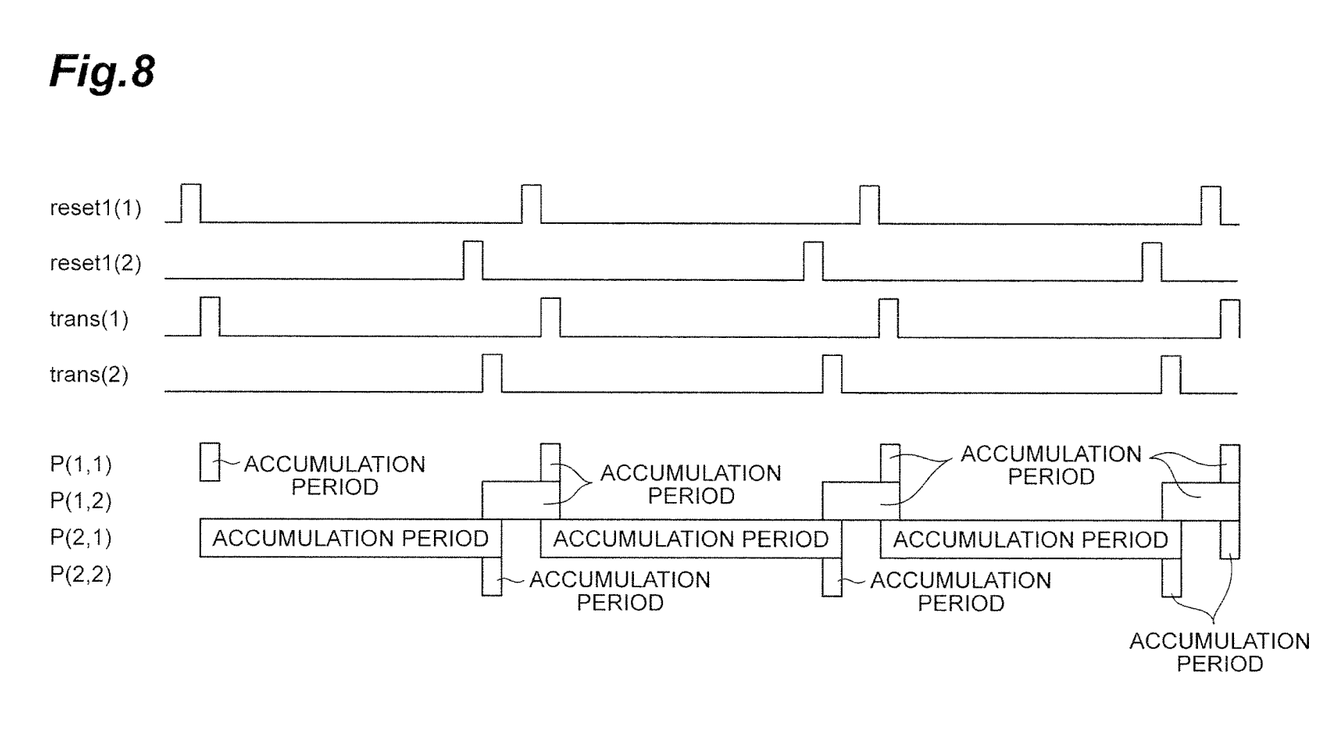
FIG. 8 is a timing chart illustrating an operation example of the solid-state imaging device of the embodiment in FIG. 7.
Figure 9:
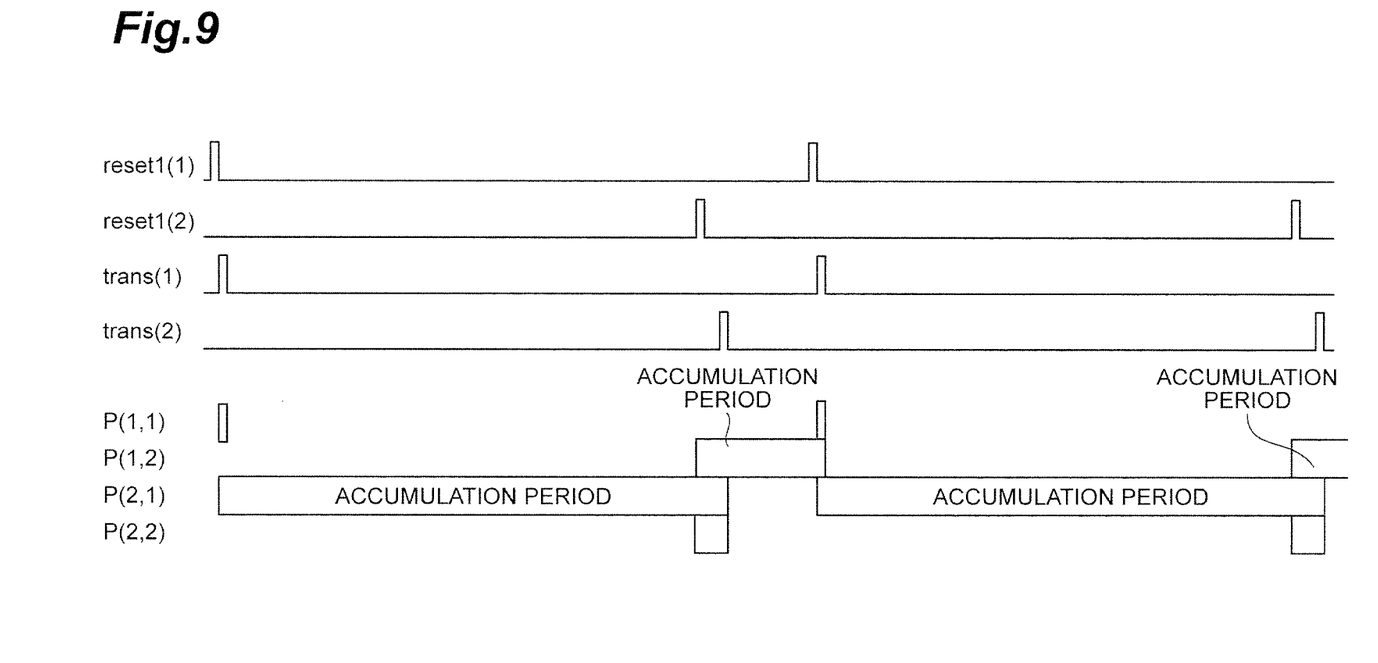
FIG. 9 is a timing chart illustrating an operation example of the solid-state imaging device of the embodiment in FIG. 7.

FIG. 8 and FIG. 9 are timing charts illustrating operation examples of the solid-state imaging device of the embodiment illustrated in FIG. 7. In the operation example illustrated in FIG. 8, within each block, when a length of the charge accumulation period of each of the pixel unit of the first row and the first column and the pixel unit of the second row and the second column is 1, a length of the charge accumulation period of the pixel unit of the first row and the second column is 4, and a length of the charge accumulation period of the pixel unit of the second row and the first column is 16. In the operation example illustrated in FIG. 9, within each block, when a length of the charge accumulation period of the pixel unit of the first row and the first column is 1, a length of the charge accumulation period of the pixel unit of the second row and the second column can be 4, a length of the charge accumulation period of the pixel unit of the first row and the second column can be 16, and a length of the charge accumulation period of the pixel unit of the second row and the first column can be 64.

Figure 10:
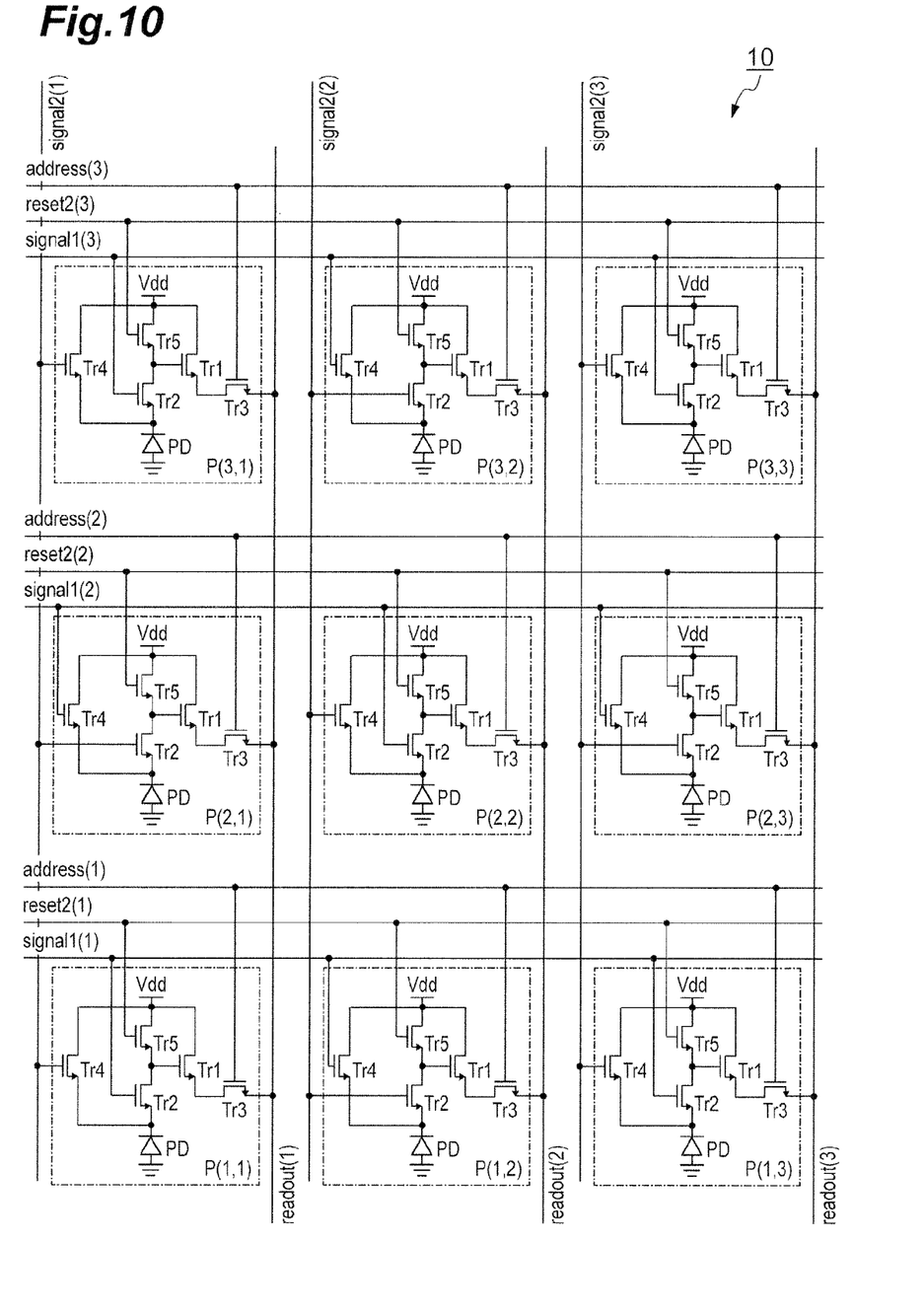
FIG. 10 is a diagram illustrating a main configuration of a solid-state imaging device of still another embodiment.

FIG. 10 is a diagram illustrating a main configuration of a solid-state imaging device of still another embodiment. In this embodiment, pixel units of a first type and pixel units of a second type are alternately arranged in both of a row direction and a column direction in the photodetecting unit 10. In the pixel unit of the first type, the transfer transistor Tr2 performs an on/off operation based on a signal1($m$) signal output from the row control unit 20, and the first initialization transistor Tr4 performs an on/off operation based on a signal2($n$) signal output from the column control unit 30.

In the pixel unit of the second type, the first initialization transistor Tr4 performs an on/off operation based on a signal1($m$) signal output from the row control unit 20, and the transfer transistor Tr2 performs an on/off operation based on a signal2($n$) signal output from the column control unit 30. In FIG. 10, pixel units P(1,1) to P(3,3) of three rows and three columns are illustrated. Among these, the pixel units P(1,1), P(1,3), P(2,2), P(3,1), and P(3,3) are pixel units of the first type. The pixel units P(1,2), P(2,1), P(2,3), and P(3,2) are pixel units of the second type.

Figure 11:
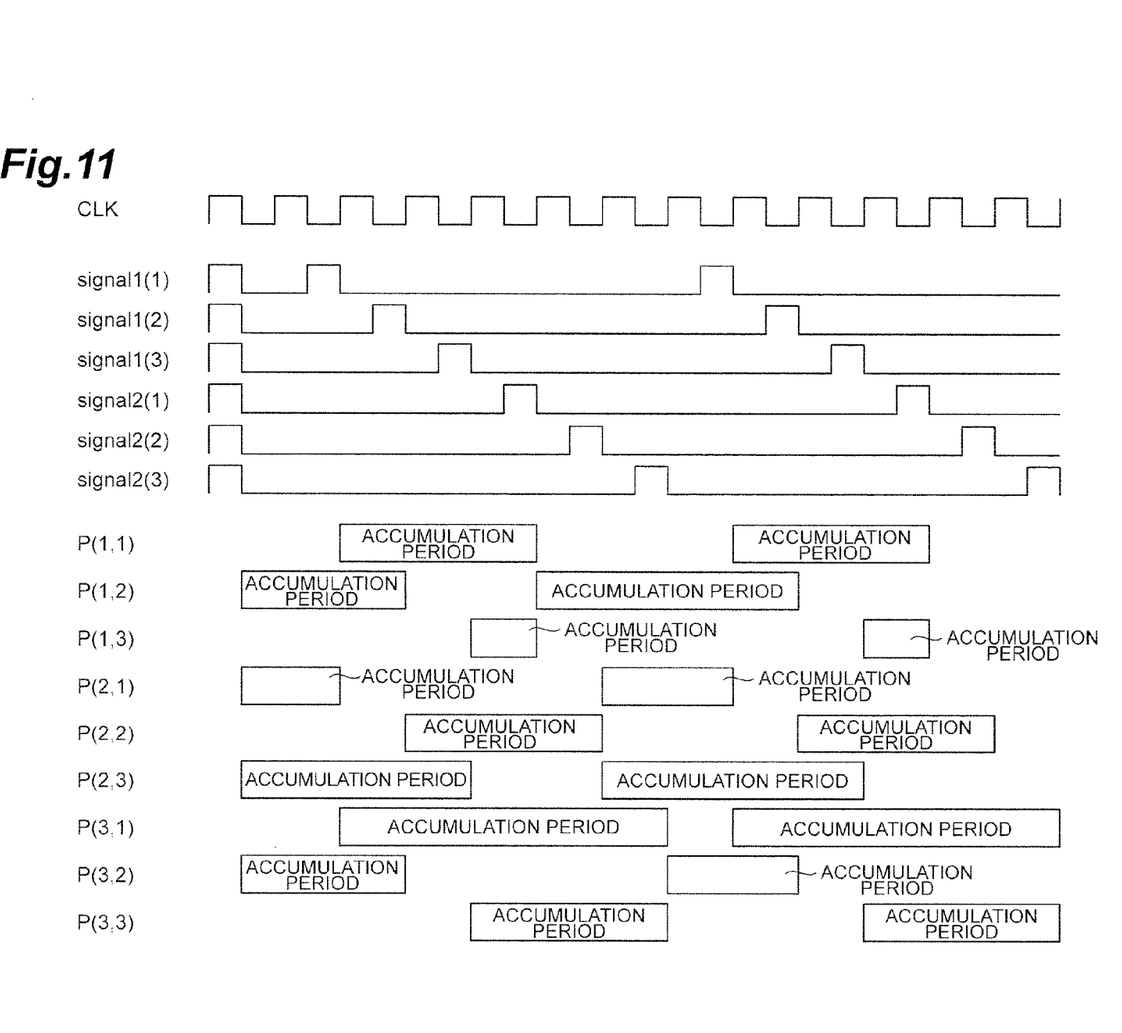
FIG. 11 is a timing chart illustrating an operation example of the solid-state imaging device of the embodiment in FIG. 10.

FIG. 11 is a timing chart illustrating an operation example of the solid-state imaging device of the embodiment illustrated in FIG. 10. As illustrated in FIG. 11, in this embodiment, since the pixel units of the first type and the pixel units of the second type are alternately arranged in both of the row direction and the column direction in the photodetecting unit 10, it is possible to increase a degree of freedom of setting of each of a charge accumulation start time and a charge accumulation end time and to widen a dynamic range.

The solid-state imaging device according to the present invention is not limited to the embodiments and configuration examples described above, and various modifications can be made.

A solid-state imaging device according to the embodiment includes a photodetecting unit including M×N pixel units P(1,1) to P(M,N) two-dimensionally arrayed in M rows and N columns, a row control unit that outputs a control signal for controlling an operation of N pixel units P(m,1) to P(m,N) in an m-th row of the photodetecting unit to each row, a column control unit that outputs a control signal for controlling an operation of M pixel units P(1,n) to P(M,n) in an n-th column of the photodetecting unit to each column, and a signal readout unit that reads out signals from the M×N pixel units P(1,1) to P(M,N) of the photodetecting unit. Here, M and N are each an integer of 2 or more, m is an integer of 1 or more and M or less, and n is an integer of 1 or more and N or less.

Further, in the solid-state imaging device, each pixel unit P(m,n) of the photodetecting unit includes a photodiode that generates a charge of an amount according to an incident light amount, an amplifying transistor that outputs a signal having a value according to an amount of charge of a gate terminal, a transfer transistor that transfers the charge generated in the photodiode to the gate terminal of the amplifying transistor, a readout transistor that outputs a signal output from the amplifying transistor to the signal readout unit, a first initialization transistor that initializes charge accumulation in the photodiode, and a second initialization transistor that initializes charge accumulation in the gate terminal of the amplifying transistor.

Further, in the solid-state imaging device, one of the transfer transistor and the first initialization transistor performs an on/off operation based on the control signal output from the row control unit, and the other performs an on/off operation based on the control signal output from the column control unit.

In the solid-state imaging device, it is preferable that the M×N pixel units P(1,1) to P(M,N) of the photodetecting unit are divided into a plurality of blocks, and each of the plurality of blocks includes pixel units arrayed in Q rows and R columns. Further, it is preferable that, in a pixel unit of a q-th row and an r-th column in each of the plurality of blocks, the transfer transistor performs the on/off operation based on the same control signal and the first initialization transistor performs the on/off operation based on the same control signal. Here, at least one of Q and R is an integer of 2 or more, q is an integer of 1 or more and Q or less, and r is an integer of 1 or more and R or less.

In the solid-state imaging device, it is preferable that, in the photodetecting unit, a pixel unit in which the transfer transistor performs the on/off operation based on the control signal output from the row control unit and the first initialization transistor performs the on/off operation based on the control signal output from the column control unit, and a pixel unit in which the first initialization transistor performs the on/off operation based on the control signal output from the row control unit and the transfer transistor performs the on/off operation based on the control signal output from the column control unit are arranged in a mixed manner. The pixel units of the two types may be alternately arranged in both of a row direction and a column direction, and there may be configurations of various arrangement patterns.

INDUSTRIAL APPLICABILITY

The present invention can be used as a solid-state imaging device capable of setting an accumulation period of various patterns different for each pixel.

REFERENCE SIGNS LIST

1—solid-state imaging device, 10—photodetecting unit, 20—row control unit, 30—column control unit, 40—signal readout unit, P(1,1) to P(M,N)—pixel unit, PD photodiode, Tr1—amplifying transistor, Tr2 transfer transistor, Tr3—readout transistor, Tr4—first initialization transistor, Tr5—second initialization transistor.

The invention claimed is:

1. A solid-state imaging device comprising:
a photodetecting unit including M×N pixel units P(1,1) to P(M,N) two-dimensionally arrayed in M rows and N columns;
a row control unit outputting a control signal for controlling an operation of N pixel units P(m,1) to P(m,N) in an m-th row of the photodetecting unit to each row;
a column control unit outputting a control signal for controlling an operation of M pixel units P(1,n) to P(M,n) in an n-th column of the photodetecting unit to each column; and
a signal readout unit reading out signals from the M×N pixel units P(1,1) to P(M,N) of the photodetecting unit, wherein
each pixel unit P(m,n) of the photodetecting unit
includes a photodiode that generates a charge of an amount according to an incident light amount, an amplifying transistor that outputs a signal having a value according to an amount of charge of a gate terminal, a transfer transistor that transfers the charge generated in the photodiode to the gate terminal of the amplifying transistor, a readout transistor that outputs the signal output from the amplifying transistor to the signal readout unit, a first initialization transistor that initializes charge accumulation of the photodiode, and a second initialization transistor that initializes charge accumulation of the gate terminal of the amplifying transistor, and
one of the transfer transistor and the first initialization transistor performs an on/off operation based on the control signal output from the row control unit and the other performs an on/off operation based on the control signal output from the column control unit (where M and N are each an integer of 2 or more, m is an integer of 1 or more and M or less, and n is an integer of 1 or more and N or less).

2. The solid-state imaging device according to claim 1, wherein the M×N pixel units P(1,1) to P(M,N) of the photodetecting unit are divided into a plurality of blocks,
each of the plurality of blocks includes pixel units arrayed in Q rows and R columns, and
in a pixel unit of a q-th row and an r-th column in each of the plurality of blocks, the transfer transistor performs the on/off operation based on the same control signal and the first initialization transistor performs the on/off operation based on the same control signal (where at least one of Q and R is an integer of 2 or more, q is an integer of 1 or more and Q or less, and r is an integer of 1 or more and R or less).

3. The solid-state imaging device according to claim 1, wherein, in the photodetecting unit,
a pixel unit in which the transfer transistor performs the on/off operation based on the control signal output from the row control unit and the first initialization transistor performs the on/off operation based on the control signal output from the column control unit, and
a pixel unit in which the first initialization transistor performs the on/off operation based on the control signal output from the row control unit and the transfer transistor performs the on/off operation based on the control signal output from the column control unit are arranged in a mixed manner.

* * * * *